Patented Mar. 21, 1933

1,902,398

UNITED STATES PATENT OFFICE

SYLVESTER M. EVANS, OF NITRO, WEST VIRGINIA, ASSIGNOR TO THE RUBBER SERVICE LABORATORIES COMPANY, OF AKRON, OHIO, A CORPORATION OF OHIO

PROCESS OF MANUFACTURING VULCANIZED RUBBER AND PRODUCTS OBTAINED THEREBY

No Drawing.  Application filed June 17, 1930.  Serial No. 461,850.

The present invention relates to a process for manufacturing vulcanized rubber products and to the products obtained thereby. More particularly, the invention is directed to a process for vulcanizing rubber wherein there is incorporated into a rubber mix of vulcanization characteristics, a compound of the type hereinafter disclosed whereby anti-oxidant or age resisting and other desirable properties are developed in the vulcanized rubber product. The invention will be understood from the following description and examples, wherein a preferred mode of operating the invention is fully set forth and described.

It is well known to those skilled in the art of rubber compounding, that many rubber compounds and particularly those cured in the presence of many of the vulcanization accelerators now employed, possess relatively poor aging qualities; that is, the vulcanized rubber product in which they are incorporated, deteriorates more or less rapidly in service particularly when exposed to air, heat and sunlight and that such deterioration exhibits itself by a marked decrease in the tensile strength, resiliency and other desirable properties of the fabricated vulcanized product.

The age resisting characteristics of a vulcanized rubber product are readily ascertained by subjecting samples of the vulcanized rubber product to an accelerated age test wherein said rubber product is placed in a bomb and subjected to the action of oxygen under pressure and maintained thereat for several hours at an elevated temperature. The treated samples are then examined and tested and the results compared with similar results obtained by testing the unaged vulcanized stock. The deterioration in properties suffered as a result of the oxidation treatment is indicative of the result that normally would be expected from that particular stock during several years of natural aging. Such a test is known as the Bierer-Davis aging test.

According to the present invention a new class of anti-oxidants has been provided, which, upon incorporation into a rubber stock and preferably in a tread stock, imparts such excellent age resisting qualities to the vulcanized product that portions thereof, when subjected for periods of from 24 to 39 hours to the artificial aging tests hereinbefore described, are found to be very resistant to oxidation and resulting deterioration. The compounds herein disclosed as imparting such anti-oxidant properties to vulcanized rubber comprise a reaction product of an hydroxy aryl sulfide and an aromatic amine.

One method whereby one of the preferred class of anti-oxidants, for example the reaction product of dioxy dinaphthyl sulfide and aniline may be prepared, is as follows.

Substantially one molecular proportion of dioxy-dinaphthyl-mono sulfide and slightly more than two molecular proportions of aniline were placed in a suitable vessel equipped with a condenser and heated with agitation for approximately four to six hours, preferably at a temperature of from 180° to 210° C. On completion of the reaction, the uncombined aniline was removed from the reaction product, preferably by steam distillation. The residue, after digesting with a dilute alkaline solution, for example at 5% aqueous sodium hydroxide solution, was washed substantially free of alkali and dried. The material thus obtained was a solid melting at approximately 86 to 92° C. If convenient or desirable, the above reaction may be carried out in the presence of a catalyst or condensing agent, such for example as iodine and the like.

A portion of the material prepared as described was milled in the well known manner into a typical rubber tread stock comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| The reaction product of dioxy dinaphthyl sulfide and aniline | 1 |

The stock was then vulcanized by heating sheets of the milled stock in the usual manner for different periods of time in a press maintained at the temperature given by forty pounds of steam pressure to the square inch (that is 287° F.). Portions of the stock cured as set forth were then artificially aged by heating in an oxygen bomb in the manner described for 39 hours at a temperature of 70° C. and maintained under a pressure of 300 pounds of oxygen per square inch. The results obtained on testing the aged and unaged stocks are given in Table I.

Table I

| Time of cure, mins. | Hours aged | Modulus of elasticity in lbs/in² at elongations of | | Tensile at break in lbs/in² | Ultimate elongation % |
|---|---|---|---|---|---|
| | | 300% | 500% | | |
| 30 | 0 | 55 | 2280 | 3710 | 670 |
| 30 | 39 | 860 | 2000 | 2225 | 515 |
| 60 | 0 | 1290 | 3080 | 4365 | 630 |
| 60 | 39 | 1290 | | 2330 | 485 |
| 90 | 0 | 1600 | 3645 | 4395 | 580 |
| 90 | 39 | 1540 | | 2700 | 470 |

From the data set forth in Table I it is apparent that the preferred class of antioxidant compounds, for example a reaction product of dioxy dinaphthyl mono sulfide and aniline possess very desirable anti-oxidant properties.

Another example of the preferred class of anti-oxidants, comprises a reaction product of substantially one molecular proportion of dioxy dinaphthyl disulfide and substantially two molecular proportions of aniline. One method whereby this material has been prepared comprises heating dioxy-dinaphthyl-disulfide and aniline, in the ratio of substantially one molecular proportion of the former to a slight excess over substantially two molecular proportions of the latter, for approximately four to six hours at a temperature of approximately 180 to 210° C. After the reaction was completed, the preferred material was isolated preferably by washing the reaction product first with a weak alkali, for example an aqueous 5% sodium hydroxide solution, then with water and finally with an acid, for example a 10% hydrochloric acid solution. The product thus obtained, after washing with water and drying, was a solid melting at 75.6 to 81.4° C.

A portion of the material prepared as described was incorporated in the well known manner in a rubber stock comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| The reaction product of substantially one molecular proportion of dioxy dinaphthyl disulfide and substantially two molecular proportions of aniline | 1 |

The stock was vulcanized in the usual manner by heating in a press maintained under the temperature given by 40 pounds of steam pressure per square inch (287° F.). Portions of the stock cured for different periods of time as described were subjected to aging tests by heating the stocks in an oxygen bomb for 39 hours at 70° C. and under a pressure of 300 pounds of oxygen per square inch. The results obtained by testing the aged and unaged stocks follow.

Table II

| Time of cure, mins. | Hours aged | Modulus of elasticity in lbs/in² at elongations of | | Tensile at break in lbs/in² | Ultimate elongation % |
|---|---|---|---|---|---|
| | | 300% | 500% | | |
| 30 | 0 | 928 | 2355 | 2670 | 540 |
| 30 | 39 | 974 | 2075 | 2285 | 530 |
| 60 | 0 | 1450 | 3240 | 4755 | 650 |
| 60 | 39 | 1405 | 2580 | 2670 | 505 |
| 90 | 0 | 1590 | 3560 | 4600 | 610 |
| 90 | 39 | 1500 | | 2540 | 480 |

It is shown from the above results that the reaction product of dioxy dinaphthyl disulfide and aniline possess the desirable anti-oxidant properties of the new class of vulcanization anti-oxidants herein described.

As another example of the use of the preferred class of compounds, the reaction product of substantially one molecular proportion of dioxy-dinaphthyl mono sulfide and substantially two molecular proportions of beta naphthyl amine was prepared in a manner analogous to that by which the reaction product of dioxy-dinaphthyl-disulfide and aniline was obtained. The solid material thus obtained, after further purifying by washing with an organic solvent such for example as ethyl alcohol, melted at approximately 176 to 180° C. A portion of the product described was compounded in a typical rubber tread stock in the usual manner comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

The compounded rubber stock was then vulcanized by heating in a press in the well known manner for different periods of time at the temperature of 40 pounds of steam pressure per square inch, and the cured rubber product aged in the manner hereinbefore described. A comparison between the aged and unaged vulcanized rubber stock is given in Table III.

*Table III*

| Time of cure, mins. | Hours aged | Modulus of elasticity in lbs/in² at elongations of | | Tensile at break in lbs/in² | Ultimate elongation % |
|---|---|---|---|---|---|
| | | 300% | 500% | | |
| 30 | 0 | 686 | 1818 | 2600 | 630 |
| 30 | 39 | 727 | | 1590 | 490 |
| 60 | 0 | 1230 | 2845 | 3810 | 635 |
| 60 | 39 | 1145 | 2258 | 2258 | 500 |
| 90 | 0 | 1575 | 3460 | 4050 | 580 |
| 90 | 39 | 1398 | | 2005 | 420 |

The reaction product of dioxy-dinaphthyl sulfide and alpha naphthyl amine has been prepared by reacting substantially one molecular proportion of dioxy-dinaphthyl sulfide and an excess over substantially two molecular proportions of alpha naphthyl amine in a manner analogous to that previously described for other products of the class disclosed. This material has likewise been compounded in a rubber stock in the usual manner comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

A comparison between the aged and unaged vulcanized rubber product, showed that the reaction product of dioxy dinaphthyl sulfide and alpha naphthyl amine also possessed the desirable anti-oxidant properties characteristic of the preferred class of compounds set forth herein.

Hydroxy aryl polysulfides may also be reacted with aromatic amines and employed as anti-oxidants. Thus substantially one molecular proportion of dioxy-dinaphthyl tetrasulfide was heated with an excess over two molecular proportions of aniline in the presence of a small proportion of a catalyst or condensing agent, for example iodine, for approximately 2 to 4 hours, at a temperature of substantially 180 to 210° C. Any unreacted aniline was separated from the reaction product by any convenient means but preferably by steam distillation. The residual product was then washed first preferably with a weak alkali for example a 5% aqueous sodium hydroxide solution and then with water, and dried. The product thus obtained melting at substantially 98 to 101° C. was incorporated in a rubber stock comprising:

| | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | 1 |
| Anti-oxidant | 1 |

The rubber product thus compounded was vulcanized by heating in a press, and portions of the cured product aged in the manner previously described. A comparison between the tensile and modulus properties of the aged and unaged cured rubber product follows in Table IV.

*Table IV*

| Time of cure, mins. | Lbs. steam pressure | Hours aged | Modulus of elasticity in lbs./in² at elongations of | | Tensile at break in lbs/in² | Ultimate elongation % |
|---|---|---|---|---|---|---|
| | | | 300% | 500% | | |
| 30 | 40 | 0 | 731 | 1910 | 2650 | 610 |
| 30 | 40 | 39 | 805 | | 1768 | 595 |
| 60 | 40 | 0 | 1263 | 2920 | 4000 | 640 |
| 60 | 40 | 39 | 1213 | | 2220 | 490 |
| 90 | 40 | 0 | 1540 | 3280 | 4070 | 595 |
| 90 | 40 | 39 | 1423 | | 2185 | 430 |

The data set forth in Table IV shows that the reaction products of hydroxy aryl polysulfides and aromatic amines when compounded in a rubber stock of vulcanization characteristics likewise produce a rubber product possessing age retarding properties.

As a further example of operating the present invention the hydroxy aryl sulfide prepared by reacting phenol and sulfur mono chloride phreferably in the ratio of substantially two molecular proportions of the former to substantially one molecular proportion of the latter was reacted further with an excess over two molecular proportions of alpha naphthyl amine by heating the two reactants for substantially three to five hours at a temperature of substantially 180 to 210° C. The product prepared in the manner described, comprising a dark resin, was incorporated in a rubber mix in the usual manner comprising

|  | Parts |
|---|---|
| Smoked sheet rubber | 100 |
| Carbon black | 40 |
| Zinc oxide | 10 |
| A blended mineral oil and rosin | 2 |
| Sulfur | 3.25 |
| Diphenyl guanidine | .1 |
| Anti-oxidant | 1 |

The rubber stock thus compounded was cured in the well known manner and portions of the cured rubber product were aged in the manner hereinbefore set forth. A comparison between the physical properties of the unaged and aged vulcanized rubber product is given in Table V, which follows.

Table V

| Time of cure, mins. | Lbs. steam pressure | Hours aged | Modulus of elasticity in lbs/in$^2$ at elongations of | | Tensile at break in lbs/in$^2$ | Ultimate elongation % |
|---|---|---|---|---|---|---|
| | | | 300% | 500% | | |
| 30 | 40 | 0 | 785 | 2035 | 2500 | 590 |
| 30 | 40 | 39 | 701 | ------ | 1168 | 430 |
| 60 | 40 | 0 | 1200 | 2855 | 3740 | 610 |
| 60 | 40 | 39 | 1068 | ------ | 1585 | 420 |
| 90 | 40 | 0 | 1550 | 3460 | 4100 | 590 |
| 90 | 40 | 39 | 1188 | ------ | 1545 | 390 |

From the data hereinbefore set forth it is apparent that the reaction product of a hydroxy aryl sulfide and an aromatic amine constitute a very valuable group of anti-oxidant compounds. Other aromatic amines than those hereinbefore set forth may be reacted with hydroxy aryl sulfides, and employed as anti-oxidants. Thus, the xylidines, the toluidines and analogous compounds may be reacted with dihydroxy dinaphthyl mono sulfide, dihydroxy dinaphthyl disulfide, dihydroxy dinaphthyl tetra sulfide and the like and employed as age retarders.

In all the examples hereinbefore set forth, the preferred class of anti-oxidants was employed in a rubber stock wherein diphenyl guanidine was used as an accelerator. Other accelerators could, of course, have been employed thereby producing a rubber product possessing somewhat different tensile and modulus properties than those hereinbefore set forth, but exhibiting the age resisting properties of the preferred class of anti-oxidants. Diphenyl guandine was employed as an accelerator in the control tests herein set forth since it is known that a rubber stock, produced by the use of this accelerator is notoriously bad aging and when employed without the use of an anti-oxidant produces a stock, after aging that has melted to a mass that is incapable of test.

The present invention is limited solely by the claims attached hereto as a part of the present specification, wherein its is intended to claim the invention as broadly as possible in view of the prior art.

What is claimed is:

1. The process of vulcanizing rubber which comprises heating rubber and sulfur in the presence of an anti-oxidant comprising a reaction product of a dioxy dinaphthyl sulfide and an aryl amine.

2. The process of vulcanizing rubber which comprises heating rubber and sulfur in the presence of an anti-oxidant comprising a reaction product of dioxy dinaphthyl monosulfide and aniline.

3. The process of vulcanizing rubber which comprises heating rubber and sulfur in the presence of an anti-oxidant comprising a reaction product of substantially one molecular proportion of a dioxy dinaphthyl sulfide and substantially two molecular proportions of an aryl amine.

4. The process of vulcanizing rubber which comprises heating rubber and sulfur in the presence of an anti-oxidant comprising a reaction product of substantially one molecular proportion of dioxy dinaphthyl mono sulfide and substantially two molecular proportions of aniline.

5. The vulcanized rubber product prepared by heating rubber and sulfur in the presence of an anti-oxidant comprising a reaction product of a dioxy dinaphthyl sulfide and an aryl amine.

6. The vulcanized rubber product prepared by heating rubber and sulfur in the presence of an anti-oxidant comprising a reaction product of dioxy dinaphthyl mono sulfide and aniline.

7. The vulcanized rubber product prepared by heating rubber and sulfur in the presence of an anti-oxidant comprising a reaction product of substantially one molecular proportion of a dioxy dinaphthyl sulfide and substantially two molecular proportions of an aryl amine.

8. The vulcanized rubber product prepared by heating rubber and sulfur in the presence of an anti-oxidant comprising a reaction product of substantially one molecular proportion of dioxy dinaphthyl mono sulfide and substantially two molecular proportions of aniline.

9. The process of vulcanizing rubber, which comprises heating rubber and sulfur in the presence of an anti-oxidant comprising a reaction product of a dioxy diaryl sulfide and an aryl amine.

10. The vulcanized rubber product prepared by heating rubber and sulfur in the presence of an anti-oxidant comprising a reaction product of a dioxy diaryl sulfide and an aryl amine.

In testimony whereof I hereunto affix my signature.

SYLVESTER M. EVANS.